US009837775B2

(12) United States Patent
Jo

(10) Patent No.: US 9,837,775 B2
(45) Date of Patent: Dec. 5, 2017

(54) COMMUTATOR OF MOTOR HAVING HOOKS AND A PLURALITY OF RECESSES AND MOTOR HAVING THE SAME

(71) Applicant: LG INNOTEK CO., LTD., Seoul (KR)

(72) Inventor: Jung Woo Jo, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 421 days.

(21) Appl. No.: 14/590,131

(22) Filed: Jan. 6, 2015

(65) Prior Publication Data

US 2015/0194779 A1   Jul. 9, 2015

(30) Foreign Application Priority Data

Jan. 6, 2014 (KR) .................. 10-2014-0001450

(51) Int. Cl.
*H02K 13/04* (2006.01)
*H01R 39/32* (2006.01)
*H02K 13/00* (2006.01)

(52) U.S. Cl.
CPC .......... *H01R 39/32* (2013.01); *H02K 13/006* (2013.01)

(58) Field of Classification Search
CPC ...... H02K 13/04; H02K 13/006; H01R 39/32; H01R 39/02
USPC ....................... 310/234, 233, 231
See application file for complete search history.

(56) References Cited

U.S. PATENT DOCUMENTS

| 3,914,632 | A | | 10/1975 | Nylen |
| 4,521,710 | A | * | 6/1985 | Mabuchi ............. H01R 39/32 310/234 |
| 4,649,309 | A | | 3/1987 | Bode et al. |
| 5,547,122 | A | | 8/1996 | Smeggil et al. |
| 2002/0185930 | A1 | * | 12/2002 | Furuya ............. H02K 13/04 310/233 |

FOREIGN PATENT DOCUMENTS

| DE | 37 87 514 | 2/1994 |
| DE | 20 2009 018610 | 10/2012 |
| GB | 2 134 324 | 8/1984 |
| JP | H07 222407 | 8/1995 |
| WO | WO 01/41261 | 6/2001 |
| WO | WO 0141261 A1 * | 6/2001 ............ H01R 39/32 |

OTHER PUBLICATIONS

Machine translation of WO 0141261 A1 (Jun. 2001).*
European Search Report dated Jun. 10, 2016 issued in Application No. 14200667.5.

* cited by examiner

*Primary Examiner* — Michael Andrews
(74) *Attorney, Agent, or Firm* — Ked & Associates, LLP

(57) ABSTRACT

Provided is a commutator of a motor including a body and hooks forming coil-receiving spaces between the body and inner surfaces of the hooks, wherein the hooks include recesses concavely formed on the inner surfaces of the hooks, and coils are seated on the recesses. Thus the present disclosure provides an advantageous effect of increasing fixing force of the hooks.

11 Claims, 6 Drawing Sheets

COMMUTATOR OF MOTOR HAVING HOOKS AND A PLURALITY OF RECESSES AND MOTOR HAVING THE SAME

CROSS-REFERENCE TO RELATED APPLICATION

This application claims priority under 35 U.S.C. §119 to Korean Application No. 10-2014-0001450 filed on Jan. 6, 2014, whose entire disclosure is hereby incorporated by reference.

BACKGROUND

1. Field

The present disclosure relates to a commutator of a motor and a motor including the same, and more particularly, to a commutator of a motor having hooks on which coils are wound and a motor including the same.

2. Background

A motor is a device that converts electric energy into rotational energy using the force applied to a conductor in a magnetic field. A typical motor is provided with a rotatable shaft and a rotor coupled with the shaft. In the case of a direct current motor, a brush is included, and a commutator to which electric current is supplied through the brush is provided.

Ends of coils wound on the rotor are fixed to the hooks of the commutator. The hooks to which the coils are fixed are fused with the surface of the body of the commutator. At this time, however, a clearance may occur between the hook and the surface of the body of the commutator due to the elasticity of the coil. Such a clearance may cause defects in contact between the hook and the commutator when the motor is running.

If the contact between the hook and the commutator is defective, contact resistance will be high and it will interfere with the flow of electric current, thus decreasing the performance of the motor.

BRIEF DESCRIPTION OF THE DRAWINGS

The embodiments will be described in detail with reference to the following drawings in which like reference numerals refer to like elements wherein.

DETAILED DESCRIPTION

Hereinafter, preferable embodiments of the present disclosure will be described in detail with reference to the accompanying drawings. The objects, particular advantages and novel features of the present disclosure will be more apparent from the detailed descriptions associated with the accompanying drawings and the preferable embodiments. The terms and words used in this specification and claims should not be interpreted as being limited to typical dictionary definition, but should be interpreted with meanings and concepts in accord with the technical idea of the present disclosure based on the principle that an inventor can appropriately define the concepts of terms in order to best explain his or her disclosure. When describing certain relevant known technology is determined to obscure the point of the present disclosure, such detailed description will be omitted.

Figure 1:
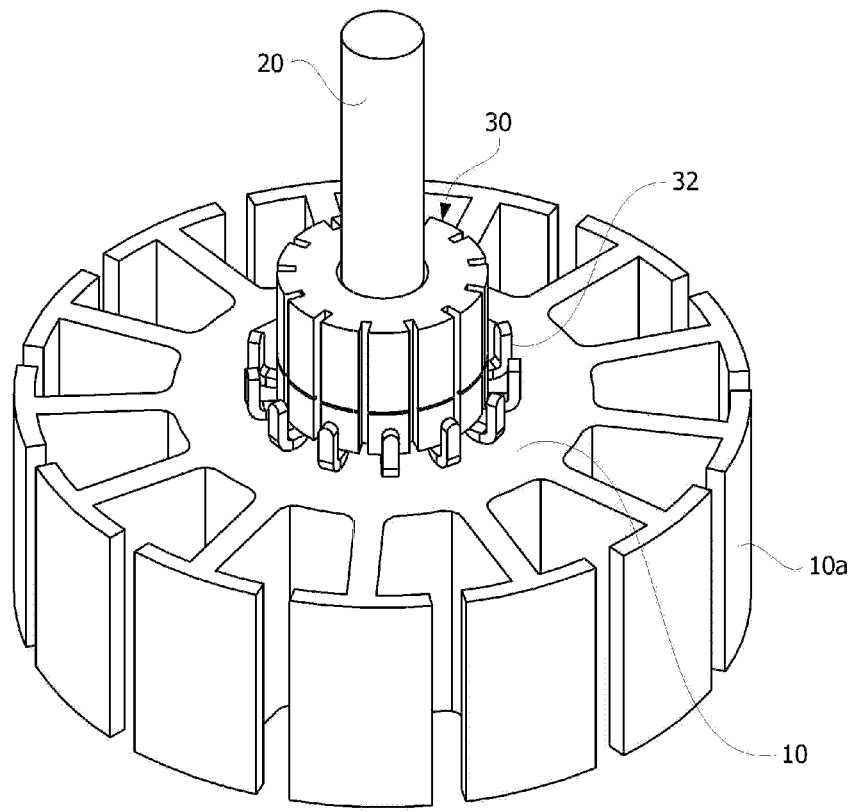
FIG. 1 illustrates a rotor and a commutator.
Figure 2:
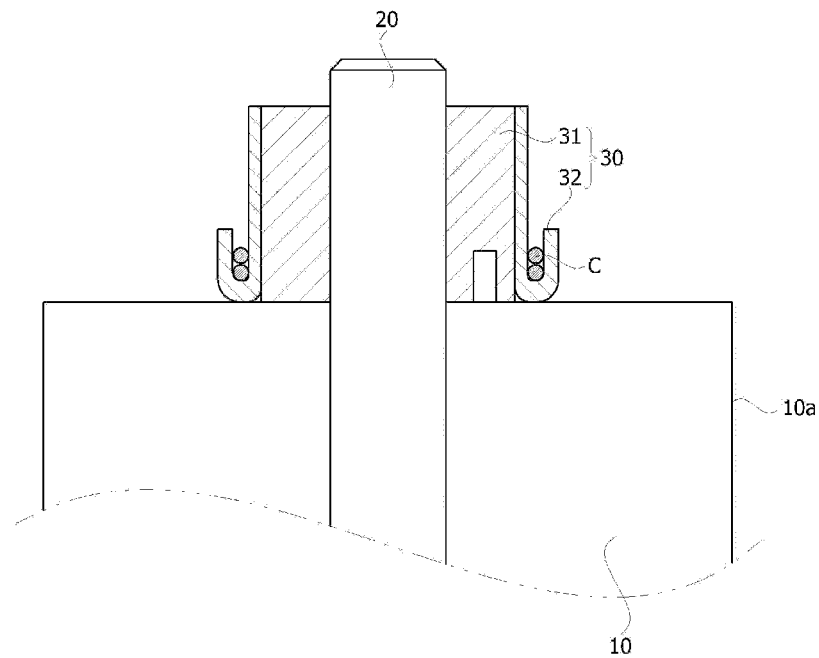
FIG. 2 illustrates coils combined with hooks of the commutator.

FIG. 1 illustrates a rotor and a commutator, and FIG. 2 illustrates coils combined with hooks of the commutator. Referring to FIG. 1, a plurality of teeth 10a may be formed on a rotor 10 in a radial direction, and coils may be wound on each of the teeth 10a. The coils may be combined with hooks 32 formed on the commutator 30.

The commutator 30 may be installed on the rotor 10 along the circumference of a rotating shaft 20. The coils C are located between a body 31 of the commutator 30 and the hooks 32, as shown FIG. 2. Fore ends of the hooks 32 are fused to the surface of the body 31 of the commutator to fix the coils C. However, due to the resisting force of the coils in the process of bending the hooks 32 toward the surface of the body 31 of the commutator 30, a clearance may occur between the body 31 of the commutator 30 and the hooks 32. The present disclosure aims to solve this problem fundamentally by mitigating the resisting force of the coils.

Figure 3:
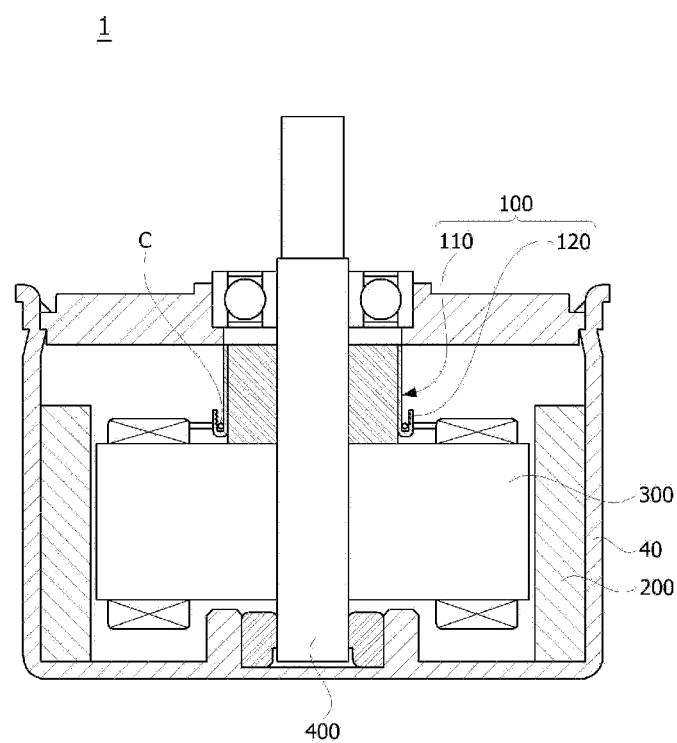
FIG. 3 illustrates a motor according to a preferable embodiment of the present disclosure.
Figure 4:
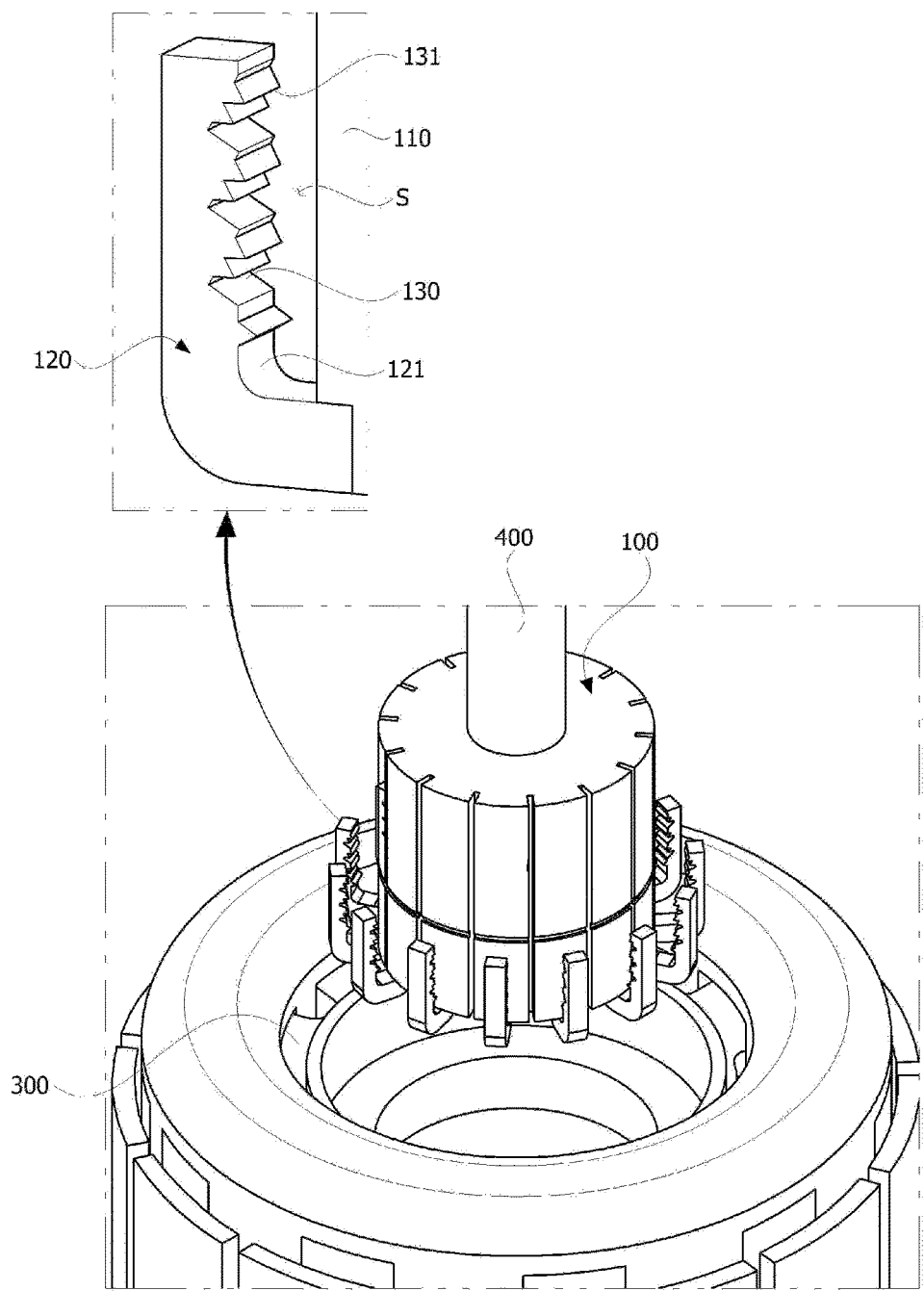
FIG. 4 illustrates the commutator of the motor shown in FIG. 1.

FIG. 3 illustrates a motor according to a preferable embodiment of the present disclosure, and FIG. 4 illustrates the commutator of the motor shown in FIG. 1. FIG. 3 and FIG. 4 illustrate clearly only major features such that the present disclosure can be clearly understood conceptually. Therefore, various modifications can be made to the illustrations in the figures, and the scope of the present disclosure is not limited to the features shown in the figures.

Referring to FIG. 3 and FIG. 4, a motor 1 according to a preferable embodiment of the present disclosure may include a stator 200 fixed in a housing 40, a rotor 300 arranged in the stator 200, a shaft 400 rotating integrally with the rotor 300, and a commutator 100 arranged on an upper end of the rotor 300.

The commutator 100 includes a body 110 and hooks 120 protruding along a circumference of the body 110. The body 110 is arranged on an upper end of the rotor 300 and has conductive surfaces.

The hooks 120 may include recesses 130 formed on inner surface 121, on which the coil C is seated. A receiving space S on which the coils C are seated is formed between the side of the body 110 and the inner surface 121 of the hook 120.

The recesses 130 serve to increase the fixing forces between the surface of the body 110 and the hooks 120 by providing receiving spaces for the coils C and thus decreasing the resisting force of the coils C. Also, the recesses 130 serve to lead the coils C to be aligned in the process of fusing the hooks 120 with the body 110. The coils C may be end parts of coils wound on the rotor 300.

In an embodiment, the recesses 130 may be concavely formed in a width direction on the inner surfaces 121 of the hooks 120. Also, a plurality of recesses 130 may be formed to be spaced a certain distance apart in a longitudinal direction of the hooks 120.

In each of the recesses 130, serrations 131 may be formed in a width direction. In an embodiment, the serrations 131 are formed in a concave-convex shape to enlarge the contact area between the coils C and the recesses 130. Particularly, the serrations may be formed with sharp edges to press and indent the coating layer of the coils C.

Figure 5:
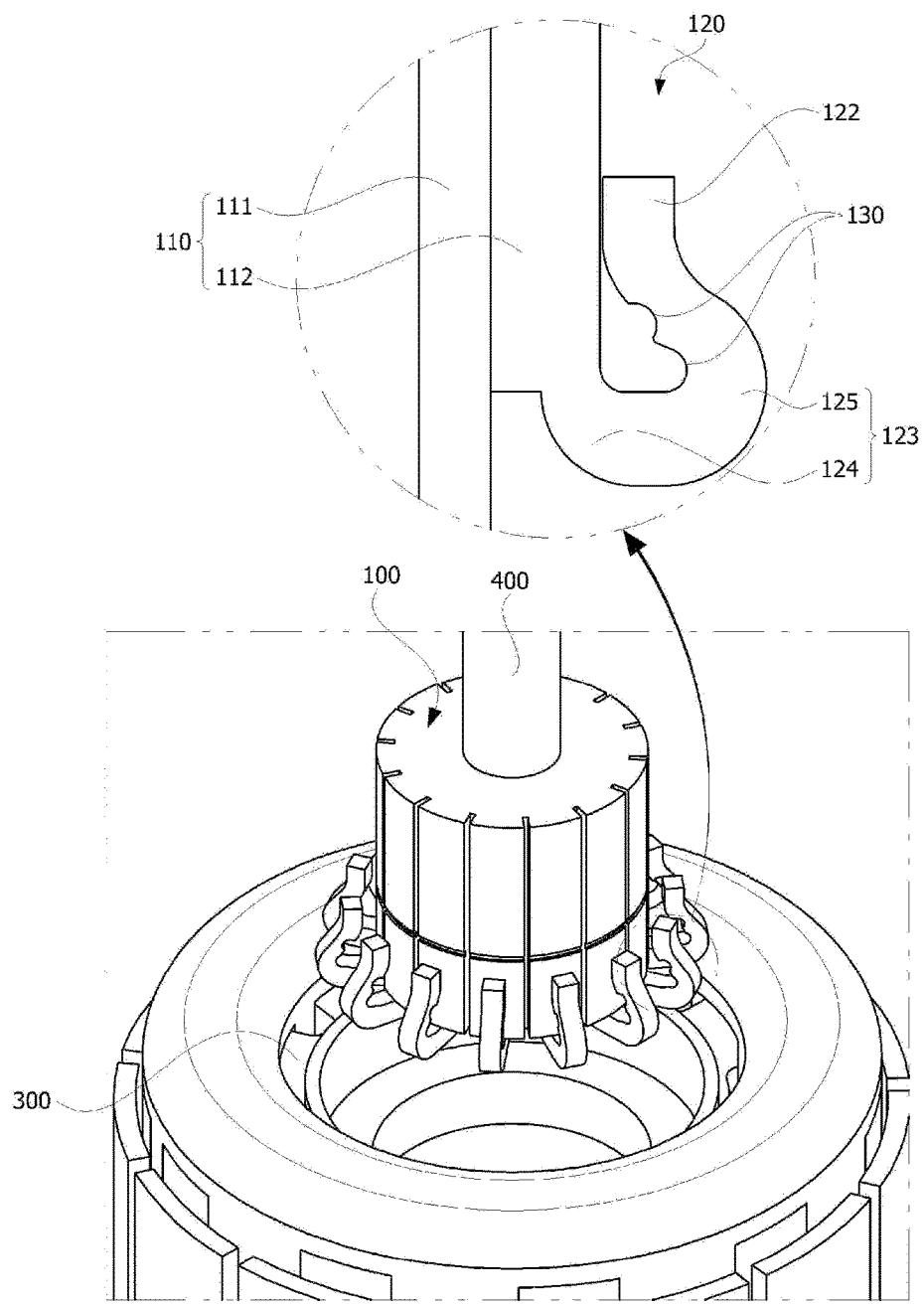
FIG. 5 illustrates the recesses shown in FIG. 4 as round recesses.

FIG. 5 illustrates the recesses shown in FIG. 4 as round recesses.

As shown in FIG. 5, the recesses 130 may be grooves as round inner circumferential surfaces. This minimizes the resisting force of the coils C by forming contact areas corresponding to the surfaces of the coils C. In this case, the sizes of the recesses 130 may be appropriately designed considering the diameter of the coils C.

The body 110 may be formed with a plurality of surface portions 112 attached along an outer circumference surface of a cylindrical core portion 111. The surface portions 112 have conductivity, and may be formed integrally with the hooks 120.

The hooks 120 include end portions 122 coming in contact with the body 110 and bent portions 123 connecting the body 110 and the end portions 122. The end portions 122 may come in electrical or physical contact with the body 110 when fused. The bent portions 123 may include first bent portions 124 connected to the body 110 and second bent portions 125 connected to the end portions 122.

The curvatures of the first bent portions 124 and the second bent portions 125 may be different from each other, that is the first bent portions 124 and the second bent portions 125 may not be rotationally symmetric with respect to a center. The second bent portions 125 may protrude in a radial direction (perpendicular to an axial direction) more than an outside surface of the end portions 112. With this configuration, the coil-receiving spaces can be formed to be larger to the extent that the second bent portions 125 protrude outward, and thus the resisting force of the coil can be minimized.

Figure 6:
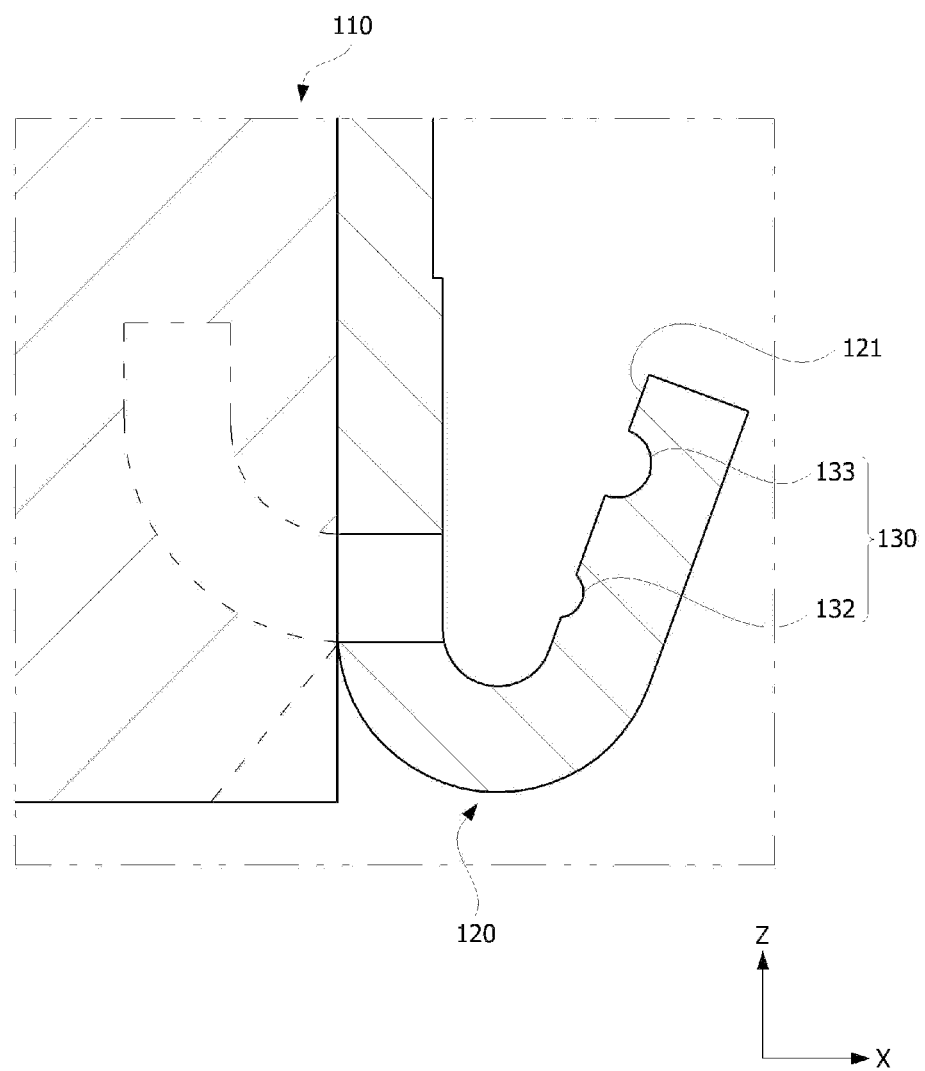
FIG. 6 illustrates recesses of different sizes.

FIG. 6 illustrates recesses of different sizes.

As shown in FIG. 6, the recesses 130 may be configured such that the size of the first recess 133 formed at a relatively higher portion in a height direction (direction of a z-axis) is larger than the size of the second recess 132 formed at a lower portion. This minimizes the resisting force of the coils C at the end portions of the hooks 120 fused with the surface of the body 110, and thus increases the combining force between the hooks 120 and the surface of the body 110. However, the present disclosure is not limited to this, but the second recess 132 may be formed with a larger size than the first recess 133.

With these recesses 130, it is possible not only to increase the combining capability between the body 110 and the hooks 120, but also to use the coils C having a large diameter, and thus the performance of the motor can be enhanced. In FIG. 6, the portion shown with a dotted line may be a protrusion fixed to the body 110.

Figure 7:
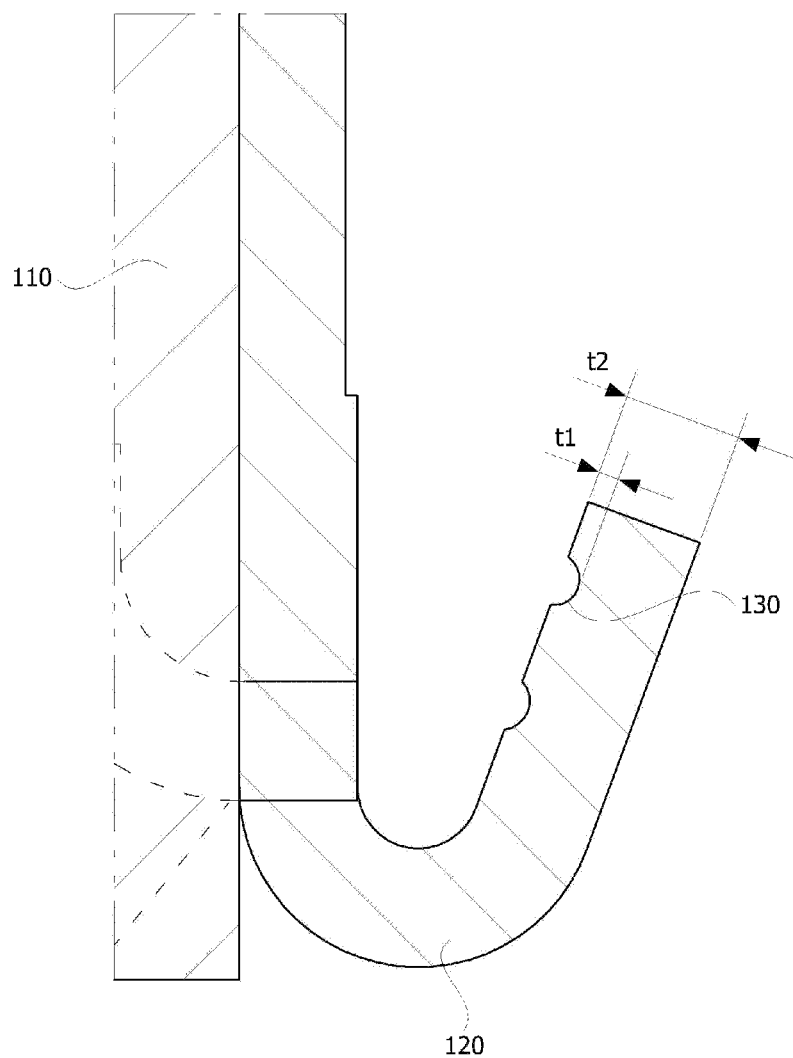
FIG. 7 illustrates a thickness of a hook and a size of the recesses.

FIG. 7 illustrates a thickness of a hook and a size of the recesses.

Referring to FIG. 7, the depth t1 of the recesses 130 and the thickness t2 of the hook 120 may be formed with a ratio in the range of 0.1:1 to 0.5:1. The ratio of the depth t1 of the recesses 130 and the thickness t2 of the hook 120 may be 0.2:1. Here, the depth t1 of the recess 130 may refer to the depth of the largest recess 130 located at the uppermost position among the recesses 130. The depth t1 of the recess 130 corresponds to the depth capable of ensuring a sufficient coil-receiving space and ensuring a sufficient strength of the hook 120.

According to an embodiment of the present disclosure, a commutator of a motor includes recesses, in which coils are seated, on the inner surfaces of hooks, and thus an advantageous effect of increasing the fixing forces of the hooks can be obtained.

Further, according to an embodiment of the present disclosure, a plurality of long recesses are formed in a width direction on the inner surfaces of the hooks, and thus an advantageous effect of aligning and fixing the coils can be obtained.

Further, according to an embodiment of the present disclosure, serrations are formed in the recesses to increase the contact areas between the coils and the inner surfaces of the hooks, and thus an advantageous effect of further increasing the fixing forces of the hooks can be obtained.

Further, according to an embodiment of the present disclosure, a size of a recess formed at a relatively higher portion is larger than a size of a recess formed at a lower portion, and thus an advantageous effect of effectively preventing a clearance from occurring at the end of the hook can be obtained.

The above descriptions merely explain the technical idea of the present disclosure exemplarily, and it will be apparent to those skilled in the art that various changes, modifications and substitutions can be made to the above-described exemplary embodiments of the present disclosure without departing from the spirit or scope of the disclosure. Therefore, the disclosed embodiments and the appended drawings are not provided to limit the technical idea of the present disclosure but to explain the technical idea of the present disclosure. Accordingly, the present disclosure is not limited to these embodiments or drawings. The scope of the present disclosure should be determined based on the scope of the appended claims, and all the technical ideas within the scope of the claims and their equivalents are to be included within the scope of the present disclosure.

The present disclosure is directed to provide a commutator of a motor having hooks with an increased fixing force and a motor including the same.

Also, the present disclosure is directed to provide a commutator of a motor in which stability of a coil on an inner surface of a hook is increased and a motor including the same.

Also, the present disclosure is directed to provide a commutator of a motor that improves the performance of the motor through coils with a large diameter fixed thereto and a motor including the same.

The objects of the present disclosure are not limited to the aforementioned objects. Other objects not mentioned above will be clearly understood by those who have ordinary knowledge in the art to which the present disclosure pertains from the following descriptions.

According to an aspect of the present disclosure, there is provided a commutator of motor including a body and hooks configured to form coil-receiving spaces between the body and inner surfaces of the hooks, wherein the hooks include recesses concavely formed on the inner surfaces of the hooks, and coils are seated on the recesses.

In the commutator of the motor, the recesses may be formed in a width direction of the hooks.

In the commutator of the motor, each of the hooks may include a plurality of recesses spaced apart from each other in a height direction of the hooks.

In the commutator of the motor, a size of a first recess formed at a relatively higher portion in the height direction may be larger than a size of a second recess formed at a relatively lower portion.

In the commutator of the motor, the hooks may include end portions configured to come in contact with the body and bent portions configured to connect the body and the end portions.

In the commutator of the motor, the bent portions may protrude outward more than the end portions.

In the commutator of the motor, the bent portions may include first bent portions connected to the body and second bent portions connected to the end portions, and curvatures of the first bent portions and the second bent portions may be different from each other.

In the commutator of the motor, the recesses may include serrations.

In the commutator of the motor, the serrations may be formed in a width direction of the hooks.

In the commutator of the motor, the ratio of the thickness of the hooks to the depth of the recesses may be in the range of 1:0.1 to 1:0.5.

According to another aspect of the present disclosure, there is provided a commutator of a motor including a body and hooks configured to form coil-receiving spaces between the body and inner surfaces of the hooks, wherein the hooks include end portions coming in contact with the body and a bent portions connecting the body and the end portions, and the bent portions protrudes outward more than the end portions.

According to still another aspect of the present disclosure, there is provided a motor including a stator; a rotor arranged in the stator; a shaft coupled with the rotor; and a commutator including a body arranged on upper end of the rotor and hooks protruding from the body, wherein the hooks include recesses formed on the inner surfaces of the hooks.

Any reference in this specification to "one embodiment," "an embodiment," "example embodiment," etc., means that a particular feature, structure, or characteristic described in connection with the embodiment is included in at least one embodiment of the disclosure. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A commutator of a motor comprising:
   a body; and
   hooks electrically connected to the body and fixing to coils therein,
   wherein the hooks comprise a plurality of recesses formed on inner surfaces of the hooks in a width direction of the hooks,
   wherein a size of a first recess is larger than a size of a second recess,
   wherein each of the hooks comprise an end portion and a bent portion, the bent portion connects the body and the end portion,
   wherein the first recess is closer to the end portion of the hook than the second recess.

2. The commutator of the motor of claim 1, wherein the bent portion protrudes radially outward more than the end portion.

3. The commutator of the motor of claim 1, wherein the bent portion comprises a first bent portion connected to the body and a second bent portion connected to the end portion, and curvatures of the first bent portion and the second bent portion are different from each other.

4. The commutator of the motor of claim 1, wherein the recesses comprise serrations.

5. The commutator of the motor of claim 4, wherein the serrations are formed in the width direction of the hooks.

6. The commutator of the motor of claim 1, wherein a ratio of a thickness of the hooks to a depth of the recesses is in a range of 1:0.1 to 1:0.5.

7. A motor comprising:
   a stator;
   a rotor arranged in the stator;
   a shaft coupled with the rotor; and
   a commutator comprising:
      a body arranged on an upper end of the rotor; and
      hooks electrically connected to the body and fixing to coils therein,
      wherein the hooks comprise a plurality of recesses formed on inner surfaces of the hooks in a width direction of the hooks,
      wherein a size of a first recess is larger than a size of a second recess,
      wherein each of the hooks comprise an end portion and a bent portion, wherein the bent portion connects to the body and the end portion, and
      wherein the first recess is closer to the end portion of the hook than the second recess.

8. The motor of claim 7, wherein the bent portion protrudes radially outward more than the end portion.

9. The motor of claim 7, wherein the bent portion comprises a first bent portion connected to the body and a second bent portion connected to the end portion, and curvatures of the first bent portion and the second bent portion are different from each other.

10. The motor of claim 7, wherein the recesses comprise serrations.

11. The motor of claim 7, wherein a ratio of a thickness of the hook to a depth of the recesses is in a range of 1:0.1 to 1:0.5.

* * * * *